A. L. TOWNSEND.
ANIMAL TRAP.
APPLICATION FILED MAR. 8, 1921.
1,382,030.
Patented June 21, 1921.
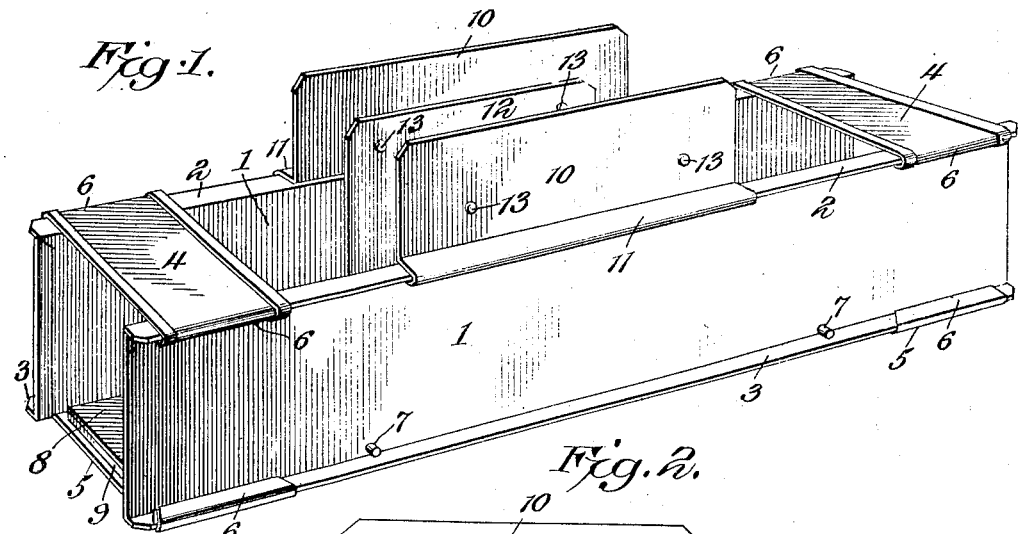
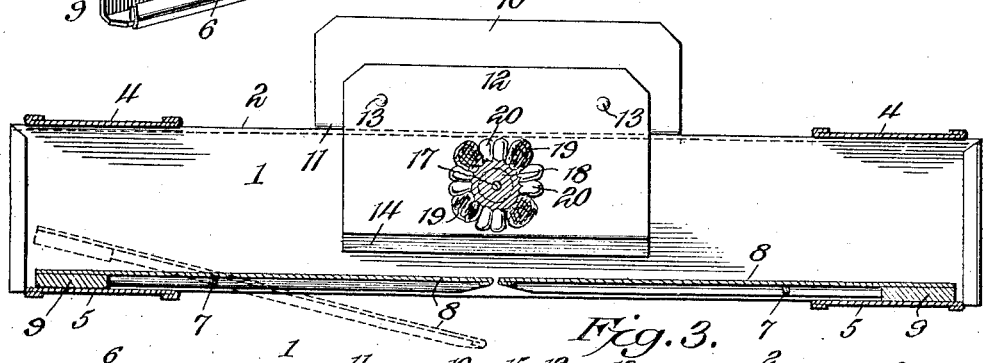
A. L. Townsend, INVENTOR
WITNESSES
BY
ATTORNEY

UNITED STATES PATENT OFFICE.

ABRAHAM L. TOWNSEND, OF IOLA, KANSAS.

ANIMAL-TRAP.

1,382,030. Specification of Letters Patent. Patented June 21, 1921.

Application filed March 8, 1921. Serial No. 450,788.

*To all whom it may concern:*

Be it known that I, ABRAHAM L. TOWNSEND, a citizen of the United States, residing at Iola, in the county of Allen and State of Kansas, have invented a new and useful Animal-Trap, of which the following is a specification.

This invention relates to animal traps and more particularly to means for trapping small animals, such as rats, mice, gophers and other rodents.

The object is to provide a trap for this purpose which is adapted to be supported over a receptacle containing water when the device is to be used indoors as when catching rats or mice while, in the event of use out of doors as when catching moles, gophers, etc., in burrows or on the level of a field, the trap may be located over a pit instead of the water receptacle.

The invention comprises an elongated runway constructed of parts which may be readily disassembled, and in the latter case, may be advantageously packed for storage or shipment. Within the runway is an unstable floor comprising tiltable sections overbalanced to remain substantially level when undisturbed, and about midway of the length of the runway there is provided a bait holder readily accessible for the application of bait through the open top of the runway above the tiltable sections, said bait holding means being readily removable to prevent the animal from consuming the bait, and easily detached from its position within the trap for the purpose of renewing the bait. The arrangement is such that the bait is located at the particularly unstable portion of the floor, and the latter is so arranged that it will not tilt under the weight of the animal until the bait zone is about reached so that in the eagerness to obtain the bait, the animal will advance along the runway, from either direction, sufficiently to enter the tilting of the floor, which tilting becomes immediately progressively rapid and the animal is precipitated into the water receptacle or pit, which is sufficiently large to prevent the escape of the same.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawing, in which similar reference characters designate corresponding parts throughout the several figures:—

Figure 1 is a perspective view of the improved animal trap;

Figure 2 is a longitudinal sectional view of the same, one of the floor members being shown in partly tilted position, in dotted lines;

Fig. 3 is a plan view of the trap;

Fig. 4 is a transverse sectional view of the same;

Fig. 5 is a detail perspective view of the bait member detached.

Referring to the drawing there is shown an elongated or tunnel-like trap, which, as will be understood, may be of any length, height and width, depending upon the class of work to be done and the size of the animals to be trapped. The trap comprises two side members 1—1 identical in formation and preferably composed of sheet iron, or some other suitable sheet metal. These side members are formed with oppositely disposed, outwardly-extending flanges 2 and 3, located at their upper and lower edges respectively and extending throughout their lengths.

Transversely disposed, upper and lower members 4 and 5 respectively, having their ends provided with return bends 6 for engagement with the flanges 2 and 3 of the side members, are located at the ends of the latter and serve to support the same in parallel, spaced, upright position, the end members 4 and 5 having their long edges bent over upon themselves to further strengthen the same. The end members which are somewhat narrower than the height of the side walls, form in substance, short top and bottom walls for the trap and provide a runway having an entrance or an exit, as the case might be, at either end of the trap, and it will be seen that the sides and end members are connected together in such manner as to be readily assembled or dismantled.

Extending cross-wise of the bottom portion of the trap, close to the lower flanges 3 are pivot rods 7, located substantially one-fourth the length of the sides from the ends of the same, said rods 7 carrying and forming pivotal supports for tiltable bottom sections 8. Each section 8 is provided at its outer end with a counterweight 9 preferably formed of a relatively heavy plate suitably secured to the underside of the tiltable section which has its longitudinal edges downturned to form flanges for the passage of the rod 7 and to serve to strengthen the said section. The pivot rods enter holes formed in the side members adjacent to the bottom flanges 3 and may be readily detached from the same, after the end members 4 and 5 are removed, when disassembling the trap, the tiltable sections being capable of being readily stored along with the other members when desired. It will be seen that the interlocking engagement of the return bends 6 of the upper and lower end members 4 and 5 will prevent any spreading of the side members 1, so that the pivot rods may not become accidentally disengaged from their seats therein.

The counterweights 9 are located in overriding relation to the lower end members 5 and rest upon the same, thus maintaining the tiltable sections normally in substantially horizontal or closed position, and the inner ends of said sections are in close proximity to each other at the center of the runway, but free to allow either one or both of the same to be tilted when under the weight of an animal, to precipitate the same into a pit or receptacle below (not shown).

Detachable side plates 10 of considerably less length than the distance between the inner opposed edges of the upper end members 4, are provided along their lower, longitudinal edges with return bends 11, adapted to surround and frictionally engage with the upper, out-turned flanges 2 of the side plates or members, and to be rigidly supported by the same in upstanding position thereon and in substantial continuation with the inner faces of the same. The opposed plates 10—10 may be moved longitudinally of the side members, but they remain where placed through frictional engagement, and each plate carries a downwardly, extending spring plate 12, suitably riveted thereto, as at 13, the length of the latter plates being somewhat less than the length of the plates 10, and having their upper edges below the upper edges of the latter. The lower portions of the spring plates 12 are spaced from the inner faces of the side members 1 and have their lower terminals inwardly bent, as at 14, to bear against the latter.

At a central point the spring plates 12 are provided with upper and lower perforations 15 and 16 respectively, for the reception of a pintle 17, upon which is adapted to be placed a short section of corn cob 18 from which alternate rows of kernels of corn have been removed to provide channels within which may be placed strips of bacon 19 or other bait, the remaining rows of kernels 20 projecting substantially flush with the outer faces of the same and forming a substantially round body which, in the event the animal might reach it, will readily revolve about its axis on the pintle rod 17 and prevent the animal from devouring any of the bait.

The bait is located sufficiently below the top edges of the plates 10 to prevent any animal from reaching the same from the open top of the trap and he will have to leave his footing upon the top edges of the side members to reach the same, when he will fall upon the tiltable members and may be effectually trapped.

Where the trap is used in a dwelling or other building it may be conveniently placed on top of a pail or the like (not shown), in which event suitable approaches, such as narrow boards, may be employed with their upper edges resting upon the outer edges of the lower transverse members 5 and in a manner not to interfere with the free tilting movement of the sections 8, as will be readily understood. Where the trap is used out of doors, a pit may be dug of less width than the length of the trap, which may then be placed over and spanning the same.

The pintle 17, with the bait properly secured to the same may be easily inserted between the side plates 10 and forced downwardly until the ends of the said pintle snap into position in the opposite alined perforations 15 and 16, as desired, in the spring portions of the plates 12, and when the trap is suitably installed and baited, animals are attracted by the bait and attempt to get the same, but before reaching the bait, the animal overbalances the tiltable section upon which it may be moving and before it can back out, or in its efforts to pass on, the bottom section swings upon the pivot with the inner end of said section dropping and so precipitating the animal into the pail or tank, as the case may be. As soon as the tilted section is relieved of the weight of the animal, the counterweight 9 returns the section to its first position ready for another animal.

The trap may be made in various sizes and is adapted to small or large animals and it will be seen from the foregoing, that a simple, cheaply manufactured trap has been provided, which may be easily baited, readily assembled or knocked-down for shipment or storage and as readily set up for use.

This application is a continuation of my application #304,176 for traps, filed June 14, 1919, in so far as the subject matter is common to both applications.

What is claimed is:

1. An animal trap comprising elongated side members having flanges along their top and bottom edges, upper transversely disposed end members having flanged edges to slidably engage the flanges at the top edges of the side members, lower transversely disposed end members having flanged edges to slidably engage the flanges of the bottom edges of the side members, whereby the top and bottom end members may be separated from the side members by sliding the same lengthwise, a pair of tilting bottom sections occupying the space at the bottom of the trap between the lower end members, removable pivot rods carried by the tilting bottom sections and having their ends fitting in holes of the side members, said upper and lower end members holding the side members from spreading and the lower end members serving as supports for the outer ends of the tilting bottom sections, longitudinally slidable upstanding plates engaged with the top flanges of the side members and extending above the same, spring plates carried by the upstanding plates and provided with alined perforations, and a bait carrying pintle adapted to be snapped into a pair of said perforations.

2. An animal trap comprising elongated side members having oppositely-disposed, outwardly-projecting longitudinal flanges at their top and bottom edges, upper and lower, transversely disposed end members having their terminals returned for engagement with said flanges, tiltable sections having transverse pintle rods mounted in the lower portions of the side members, said tiltable sections approaching at their inner ends and having counterweights at their outer ends to rest upon the adjacent lower transverse members, longitudinally-slidable, upstanding plates having return bends for engagement with the top flanges of the side members, spring plates carried by the upstanding plates and provided with alined perforations, and a bait carrying pintle adapted to be snapped into a pair of said perforations, said bait consisting of a short section of corn mob mounted to revolve thereon and having alternate rows of kernels removed to provide longitudinal recesses thereon for the reception of strips of meat or other bait.

In testimony that I claim the foregoing as my own, I have hereto affixed my signature.

ABRAHAM L. TOWNSEND.